United States Patent [19]

Stephens et al.

[11] 4,242,201
[45] Dec. 30, 1980

[54] BY-PASS WATER SOFTENER SYSTEM AND INSTALLATION

[75] Inventors: James B. Stephens, La Crescenta; Charles G. Miller, Pasadena, both of Calif.

[73] Assignee: TDV Co., Temple City, Calif.

[21] Appl. No.: 48,453

[22] Filed: Jun. 14, 1979

[51] Int. Cl.³ .............................................. C02B 1/16
[52] U.S. Cl. .................................... 210/240; 210/249; 210/282; 210/287; 4/204; 4/605
[58] Field of Search ............... 210/240, 249, 420, 421, 210/424, 446, 282, 287; 4/145, 204

[56] References Cited

U.S. PATENT DOCUMENTS

| | | | |
|---|---|---|---|
| 953,637 | 3/1910 | McCollom | 210/424 X |
| 2,007,068 | 7/1935 | Beck | 210/249X |
| 2,304,453 | 12/1942 | Gudmunsen | 210/249 X |
| 3,653,514 | 4/1972 | Holler et al. | 210/424 X |
| 3,802,563 | 4/1974 | Sasaki et al. | 210/424 X |

*Primary Examiner*—John Adee
*Attorney, Agent, or Firm*—Donald D. Mon

[57] ABSTRACT

A by-pass water softener system including a water softener made from a tube and two end caps, enclosing a charge of ion-exchange resin. A port passes through each end cap. One port is connectible to a hose which leads to a water distributor such as a hand-held shower head. The other port is connected to a diverter valve which selectively directs water from a water supply either to some other water distributor such as a wall-mounted shower head, or to a hose which leads to the other port of the water softener. A suspension device is provided to suspend the water softener, perhaps from the wall of a shower stall.

22 Claims, 5 Drawing Figures

U.S. Patent
Dec. 30, 1980
4,242,201
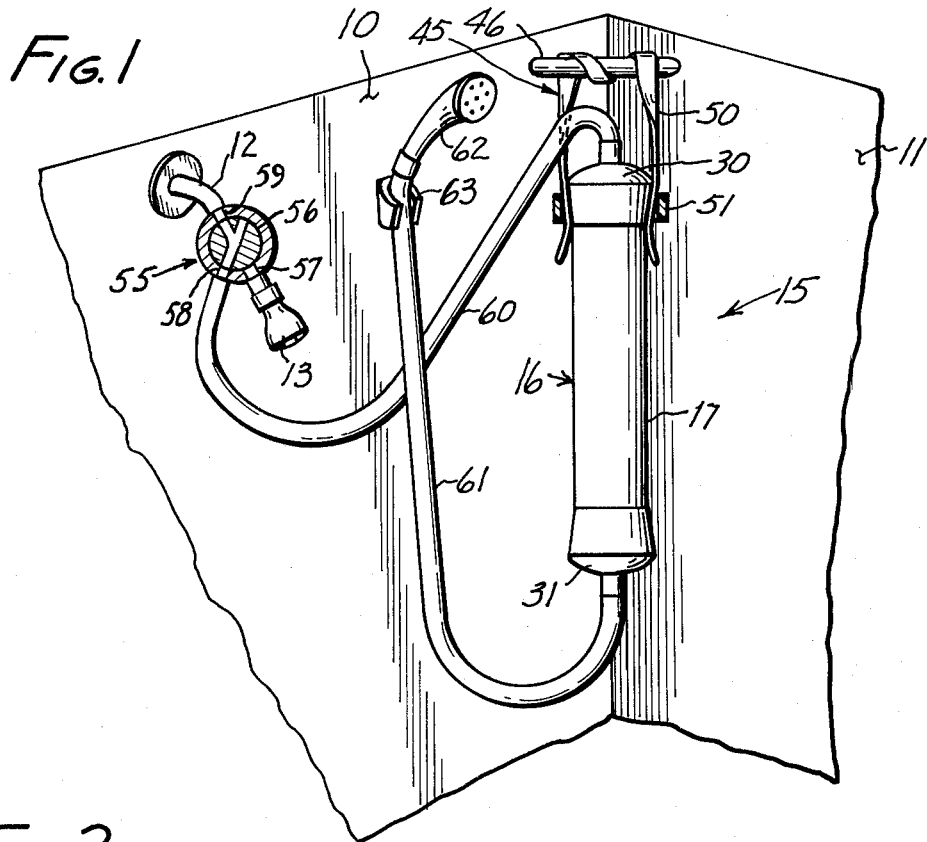
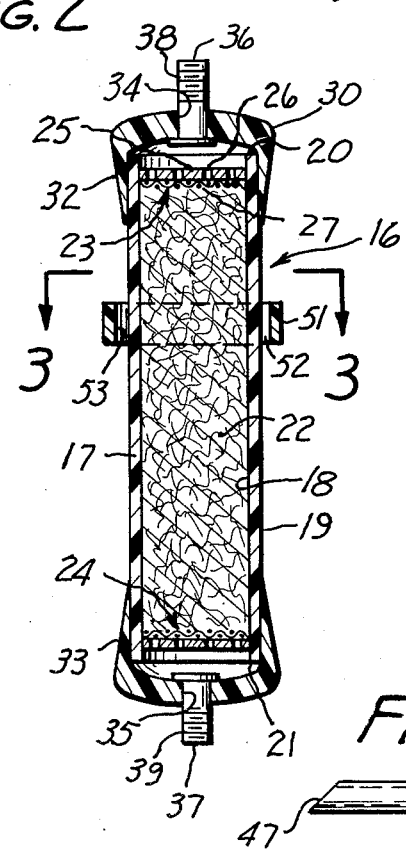
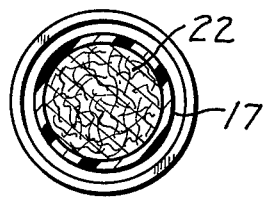
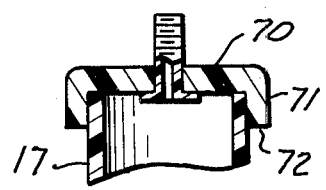

BY-PASS WATER SOFTENER SYSTEM AND INSTALLATION

This invention relates to a by-pass water softener system and to an installation of this system in a shower stall.

By-pass water softener systems are known. Their characterizing feature is that they can deliver unsoftened water directly from the water supply, or alternatively a supply of softened water. One such system is shown in U.S. Pat. No. 3,653,514, issued Apr. 4, 1972 to Holler and King, which is characterized by the inclusion of a diverter valve in a water supply system which can selectively deliver either unsoftened water directly to an outlet, or to by-pass the water to a softener and then deliver softened water.

An examination of classical by-pass water systems shows that they require considerable tooling for manufacturing the parts, and that the parts are generally complicated so they cannot be produced inexpensively from elegantly simple components. It is an object of this invention to provide a water softener which can be produced with very little tooling cost, and which can provide all the advantages of previously known by-pass water softener systems, plus additional advantages as well.

For example, this device is useful in shower installations where it can be provided with suspension means that can readily be installed by an unskilled person to suspend the device reliably in a position which assures its efficient utilization.

A by-pass water softener system according to this invention includes a water softener which itself comprises an elongated tube having a first and a second end, for holding a charge of ion exchange resin. A first and second retention means is placed adjacent to the respective first and second ends, and have perforations for water passage that are sized to retain the resin in the tube. A first and a second end cap are sealingly and structurally attached to the tube so as to close the respective first and second ends. Each of the end caps has a port passing therethrough, and first and second hose attachment means is provided at the respective first and second ports. Suspension means is attachable to the water softener for suspending it. A diverter valve has an inlet port and first and a second outlet port and selector means for directing water from the inlet port to a selected one of the outlet ports. The inlet port is connectible to a water supply. The first outlet port is connectible to a first water distributor perhaps a fixed shower head. A first flexible hose is connected to the second outlet of the diverter valve and to the first hose attachment means. A second flexible hose is connected to the second hose attachment means and can be attached to a second water distributor, perhaps a hand-held shower head.

According to a preferred but optional feature of the invention, each end cap includes a peripheral collar surrounding and extending beyond the outer wall of the tube. The ends of the tube are telescopically received in the collars and they can interfere with a ring which forms a portion of the suspension means. The suspension means also includes a flexible strap which can be held between the ring and the collar and looped over a suspension bar.

According to another preferred but optional feature of the invention, the suspension bar is straight and rod-like, having first and second ends that are mitered to fit flush with a pair of corner walls of a shower stall, there to be cemented to them in shear relationship, with the flexible strap looped over the bar.

The above and other features of this invention will be fully understood from the following detailed description and the accompanying drawings, in which:

FIG. 1 is a perspective view of the presently preferred embodiment of the invention;

FIG. 2 is an axial cross-section of the water softener of FIG. 1;

FIG. 3 is a cross-section taken at line 3—3 in FIG. 2;

FIG. 4 is a fragmentary axial cross-section of an alternate embodiment of end cap for use with the invention; and FIG. 5 is a side-view of a suspension bar useful in the invention.

In FIG. 1 there are shown a pair of intersecting corner walls 10,11 which form a portion of a conventional peripheral shower stall. A water supply pipe 12 ("sometimes called water supply means") is structurally mounted to wall 10 and projects from it. A first water distributor 13 is a conventional wall-mounted shower head and may be the same shower head which was previously installed in the shower stall prior to the installation of this by-pass water softener system. It is an advantage of this system that it can readily be installed in a conventional system, while requiring very little skill for making the installation.

The by-pass water softener system 15 includes a water softener 16 which is best shown in FIG. 2. The water softener comprises an elongated tube 17 having an inner wall 18 and an outer wall 19. The walls extend axially and concentrically. The tube has a first end 20 and a second end 21. A charge 22 of ion exchange resin is held in the tube by a first retention means 23 and a second retention means 24. Because they are identical only retention means 23 will be described in detail. It comprises a rigid perforated plate 25 with perforations 26 which are conveniently made quite large for the passage of water. In order to retain the resin, the retention means also includes a screen 27 which is sized so as to retain the resin but to permit ready flow of water. The perforated plate acts as a back up means for the screen. The charge of resin is not intended to be removed and replaced. For this reason the retention means will be permanently attached to the tube, as will later be described.

A first end cap 30 and a second end cap 31 are attached to the first and second end of the tube. The end caps extend across the ends and include peripheral collars 32, 33, respectively. Preferably they are tapered as shown in FIG. 2 for attractiveness, and also for providing a certain amount of flexible adaptation to the surface of the tube. The retention means and the end caps are conveniently attached to the tube by cementing or by solvent welding.

The first and second end caps have respective first and second ports 34,35, and in each port there is a hose attachment means 36, 37 respectively. These extend beyond the end caps and provide ribs or threads 38, 39, or other convenient irregularities for retention of the end of the hose. It will be seen that water introduced through one of the ports will pass through the resin charge and flow out the other port.

Suspension means 45 comprises a straight suspension bar (FIGS. 1 and 5) which may conveniently be a piece of rigid rod or tubing 46 with ends 47, 48 mitered so as to fit flush with walls 10 and 11. If the walls are at right angles to one another, then the ends, if extended far enough, would form a right dihedral angle. The mitered ends are planar so they will fit flush against a planar wall. The suspension means further includes a flexible strap 50 which can be provided as two separable pieces if desired for convenience in removing the water softener, or if preferred can be made in only one piece. The suspension means also includes a rigid ring 51 which fits around the tube with a clearance 52 between it and the outer wall of the tube but having an inner wall 53 which will interfere with the peripheral collar so that it cannot come loose. The ring becomes a permanent part of the water softener.

As best shown in FIGS. 1 and 2, the ends of the flexible strap can be placed inside the ring and against the peripheral collar, and the ring brought up tightly against it. The strap will have been looped around the suspension bar. Thereafter the weight of the water softener will cooperate to keep the flexible strap jammed between the peripheral ring and the end cap. The taper on the peripheral collar assists this reaction. The inside of the ring can also be somewhat tapered, if desired.

A diverter valve 55 is a three-way valve with a selector 56. The purpose of the selector is to select which of a first outlet port 57 or a second outlet port 58 water from inlet port 59 flows to. Inlet port 59 receives water from the water supply pipe 12. The first water distributor 13 is connected to the first outlet port. A first flexible hose 60 is connected to the second outlet port and to the first port 34 of the water softener at hose attachment means 36. A second flexible hose 61 is connected to the second port 35 by hose attachment means 37, and carries at its other end a second water distributor means 62 such as a hand held shower head. Hanger means 63 is mounted to wall 10 at an elevation substantially equal to that of the upper end of the water softener for reasons yet to be disclosed. The second water distributor means 62 is mounted to the free end of second flexible hose 61.

As best shown in FIG. 4, the end caps need not be externally tapered. Instead tube 17 is shown with an end cap 70 which has a peripheral collar which will interfere with the ring, but which has a square end 72 instead of a tapered wall. This is as useful, but it does not have some of the jamming effectiveness of a tapered end cap relative to the flexible strap, not does the ring tend to press the end more tightly against the tube as is the situation in FIG. 2. However, the end cap shown in FIG. 4 can be substituted for the end caps shown in FIG. 1 and 2.

This system and its installation have many important advantages, in inexpensiveness of their construction, in the facility of their installation, and in the advantages which they provide by their presence. For example, it is a simple matter to insert the diverter valve 55 between the permanently mounted shower head and the water supply pipe. Thereafter, it is only necessary to apply a layer of cement to the mitered ends of the suspension bar and press the suspension bar against the walls of the shower stall until the cement has set up. A force analysis of this suspension bar will show that there is no torque exerted on it. Instead the forces are entirely downward and in shear along the faces of the mitered ends. Cemented joints can resist very little torque, but can resist very large shear loads, therefore this simple installation will serve to hold a very substantial water softener. The hanger can simply be attached to the wall by an adhesive means such as cement or even double faced tape. It has only a light load to support and even this load is all in shear with no torque loading.

The system is readily used. For example in FIG. 1, if it is desired to take a conventional shower with unsoftened water, the diverter valve is set to the operational position not shown in FIG. 1 so that water does not pass through the softener but instead flows directly out of shower head 13. Should softened water be desired, the diverter valve will be set to the condition shown in FIG. 1, and water will flow through the first flexible hose, through the water softener, and out the second flexible hose and the hand held shower head 62. This is convenient for rinsing the hair with soft water. When the use of softened water is to be discontinued, the selector valve will be reset, and the second hose and its water distributor means will be placed back in the hanger 63 as shown. It is an important advantage and feature of this invention that the hanger be disposed at the elevation as shown because then water will completely cover the resin bed even when the unit is not in use. It is better not to permit these resin beds to dry out once they have been wetted.

Regeneration of the resin is a simple matter. In this invention it involves the supply of brine to the water softener itself. For this purpose, first flexible hose is detached from the hose attachment means and a funnel is placed in the first port. Then the funnel is filled with brine and the free end of the second flexible hose is lowered so as to permit escape of water from the water softener, and so that one can generally expel the water and admit the brine. It is also convenient to color the brine solution so that one can tell when the brine has completely filled the water softener. At that time, the second hose will again be hung up by the hanger, and the brine will be permitted to remain in contact with the resin for about two or more hours until the regeneration of ion exchange resin has been completed. During this time, the first flexible hose can be reconnected to the first port. Before using the water softener again, it is best to flush the brine out of the water softener. The water will no longer be particularly salty to the taste after the brine has been flushed out. It has been found that by utilizing a length of tubing of about 24 inches with an internal diameter of about 3 inches, a resin charge can conveniently be held which provides about 135 gallons of soft water from feed water of about 15 grain hardness. This is a substantial amount when it is realized that people utilizing installations of this type will usually do much of their bathing with standard untreated water and then complete their shower or shampoo with the soft water. Such a shampoo technique requires only about two to three gallons of soft water. The need to regenerate the resin is quite infrequent.

In addition, the water softener hose connections can readily be reversed in order to back flush it.

There is provided an inexpensive, readily manufactured water softener, and an easily assembled combination of water softener system and shower stall. It provides a useful dual type of water supply to provide either untreated water or soft water in a system which need not be plumbed into the house plumbing, and which can readily be installed by unskilled persons. The resin can be regenerated without the requirement of any skill and it takes little attention. It does not require complicated valves.

The entire system can be made of relatively inexpensive materials such as polyvinyl chloride or other organic plastic material.

This invention is not to be limited by the embodiments shown in the drawings and described in the description which are given by way of example and not of limitation, but only in accordance with the scope of the appended claims.

We claim:

1. A by-pass water softener system comprising:
    a water softener comprising an elongated tube having a first and a second end, for holding a change of ion exchange resin, a first and a second retention means adjacent said respective first and second ends, said retention means having perforations for passage of water which are sized to retain said resin in said tube, a first and a second end cap sealingly and structurally attached to the tube so as to close said respective first and second ends, each of said end caps having a port passing therethrough, and first and second hose attachment means at respective first and second ports;
    suspension means attachable to said water softener;
    a diverter valve having an inlet port, a first and a second outlet port, and selector means for directing water from said inlet port to a selected one of said outlet ports, said inlet port being connectible to a water supply, said first outlet port being connectible to a first water distributor;
    a first flexible hose connected to said second outlet port and to said first hose attachment means; and
    a second flexible hose connected at one of its ends to said second hose attachment means, its other said end being unattached to fixed structure so it is free for spatial movement relative to said tube.

2. A system according to claim 1 in which the free end of said second hose is connected to a second water distributor.

3. A system according to claim 2 in which hanger means is provided to be positioned at substantially the same elevation as the uppermost of said end cap ports for supporting said second water distributor at or above said elevation.

4. A system according to claim 1 in which both of said end caps include a peripheral collar surrounding and extending beyond the outer wall of said tube, said ends of said tube being telescopically received in said collar.

5. A system according to claim 1 in which both of said collars are tapered so as to become thinner as they extend away from the respective ends of said tube.

6. A system according to claim 4 in which said suspension means includes a rigid ring surrounding said tube between said end caps, having an inside dimension which forms a clearance with said tube and which interferes with said end caps, and a flexible member adapted to be trapped and retained between said ring and one of said end caps, and held there by the weight of the water softener.

7. A system according to claim 5 in which said suspension means includes a rigid ring surrounding said tube between said end caps, having an inside dimension which forms a clearance with said tube and which interferes with said end caps, and a flexible member adapted to be trapped and retained between said ring and one of said end caps, and held there by the weight of the water softener.

8. A system according to claim 6 in which said suspension means additionally includes a straight suspension bar having first and second ends mitered to fit flush with a pair of corner walls whereby to be cemented to them in shear relationship, with the flexible member looped over said bar.

9. A system according to claim 7 in which said suspension means additionally includes a straight suspension bar having first and second ends mitered to fit flush with a pair of corner walls whereby to be cemented thereto in shear relationship with the flexible member looped over said bar.

10. A system according to claim 3 in which each said retention means comprises a screen and a rigid perforated plate, said screen being disposed between said resin and said plate.

11. A system according to claim 1 including said charge of said resin in said tube.

12. A system according to claim 7 including said charge of said resin in said tube.

13. A system according to claim 1 in which said first water distributor is a shower head.

14. A system according to claim 3 in which said first water distributor is a shower head.

15. In combination: A shower enclosure having a pair of intersecting walls, and a water supply pipe passing through one of said walls;
    suspension means fixed to one of said walls;
    hanger means fixed to one of said walls; and
    a by-pass water softener system comprising a water softener comprising an elongated tube having a first and a second end, a charge of ion exchange resin inside said tube, a first and a second retention means adjacent said respective first and second ends, said retention means having perforations for passage of water which are sized to retain said resin in said tube, a first and a second end cap sealingly and structurally attached to the tube so as to close said respective first and second ends, each of said end caps having a port passing therethrough, and first and second hose attachment means at respective first and second ports;
    a diverter valve having an inlet port, a first and a second outlet port, and selector means for directing water from said inlet port to a selected one of said outlet ports, said inlet port being connectible to said water supply pipe, said first outlet port being connectible to a first shower head;
    a first flexible hose connected to said second outlet port and to said first hose attachment means;
    a second flexible hose connected at one of its ends to said second hose attachment means, its other said end being unattached to fixed structure so it is free for spatial movement relative to said tube;
    a second shower head connected to said other end of said second flexible hose;
    said water softener being supported by said suspension means, with said first end of the tube higher than said second end, said hanger means being disposed at an elevation substantially the same as that of the said first end, whereby releasably to support said second shower head at an elevation at least as high as the upper end of the charge of resin.

16. A combination according to claim 15 in which both of said end caps include a peripheral collar surrounding and extending beyond the outer wall of said tube, said ends of said tube being telescopically received in said collars.

17. A combination according to claim 15 in which both of said collars are tapered so as to become thinner as they extend away from the respective ends of said tube.

18. A combination according to claim 16 in which said suspension means includes a rigid ring surrounding said tube between said end caps, having an inside dimension which forms a clearance with said tube and which interferes with said end caps, and a flexible member adapted to be trapped and retained between said ring and one of said end caps, and held there by the weight of the water softener.

19. A combination according to claim 17 in which said suspension means includes a rigid ring surrounding said tube between said end caps, having an inside dimension which forms a clearance with said tube and which interferes with said end caps, and a flexible member adapted to be trapped and retained between said ring and one of said end caps, and held there by the weight of the water softener.

20. A combination according to claim 18 in which said suspension means additionally includes a straight suspension bar having first and second ends mitered to fit flush with said walls, whereby to be cemented to them in shear relationship, with the flexible member looped over said bar.

21. A combination according to claim 19 in which said suspension means additionally includes a straight suspension bar having first and second ends mitered to fit flush with a pair of corner walls whereby to be cemented to them in shear relationship, with the flexible member looped over said bar.

22. A system according to claim 15 in which said tube and end caps are made of organic plastic material, and are solvent-welded together.

* * * * *